United States Patent [19]

Buvat

[11] Patent Number: 4,747,585
[45] Date of Patent: May 31, 1988

[54] DAMPING DEVICE AND VEHICLE HEIGHT CORRECTOR USING SUCH A DEVICE

[75] Inventor: Irénée Buvat, Paris, France

[73] Assignees: Automobiles Peugeot; Automobiles Citroen, both of France

[21] Appl. No.: 881,267

[22] Filed: Jul. 2, 1986

[30] Foreign Application Priority Data

Jul. 3, 1985 [FR] France ................. 85 10187

[51] Int. Cl.⁴ .............................. F16M 1/00
[52] U.S. Cl. ................... 267/140.1; 138/42
[58] Field of Search ................. 267/140.1; 138/42, 30

[56] References Cited

U.S. PATENT DOCUMENTS

| | | | |
|---|---|---|---|
| 1,835,047 | 12/1931 | Hill | 138/42 X |
| 2,210,448 | 8/1940 | Dodge | 138/42 |
| 3,103,234 | 9/1963 | Washburn | 138/30 |

FOREIGN PATENT DOCUMENTS

| | | | |
|---|---|---|---|
| 1210339 | 2/1966 | Fed. Rep. of Germany . | |
| 1298806 | 10/1969 | Fed. Rep. of Germany . | |
| 1210681 | 3/1960 | France . | |
| 1505983 | 11/1967 | France . | |
| 728495 | 4/1955 | United Kingdom . | |
| 2043951 | 10/1980 | United Kingdom | 138/42 |

Primary Examiner—Joseph Falk
Attorney, Agent, or Firm—Steinberg & Raskin

[57] ABSTRACT

The present invention relates to a damping device comprising two identical cylindrical elements which are obliquely truncated and whose respective elliptic surfaces are provided with slots and are in tight mutual engagement with a thin wall interposed therebetween and provided with calibrated bores or holes, this damping device may be mounted on the height corrector of a vehicle equipped with a hydropneumatic suspension.

5 Claims, 3 Drawing Sheets

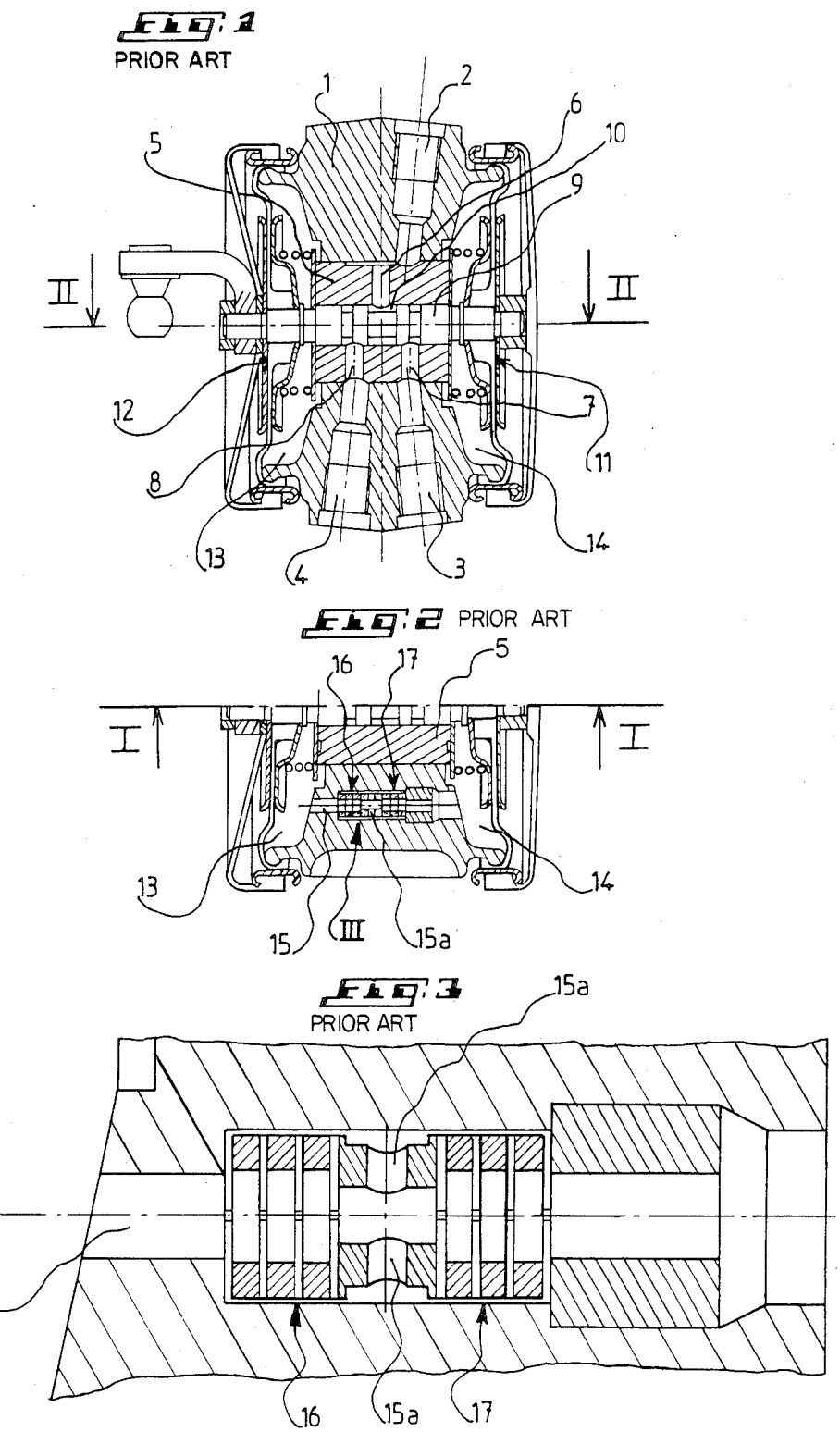

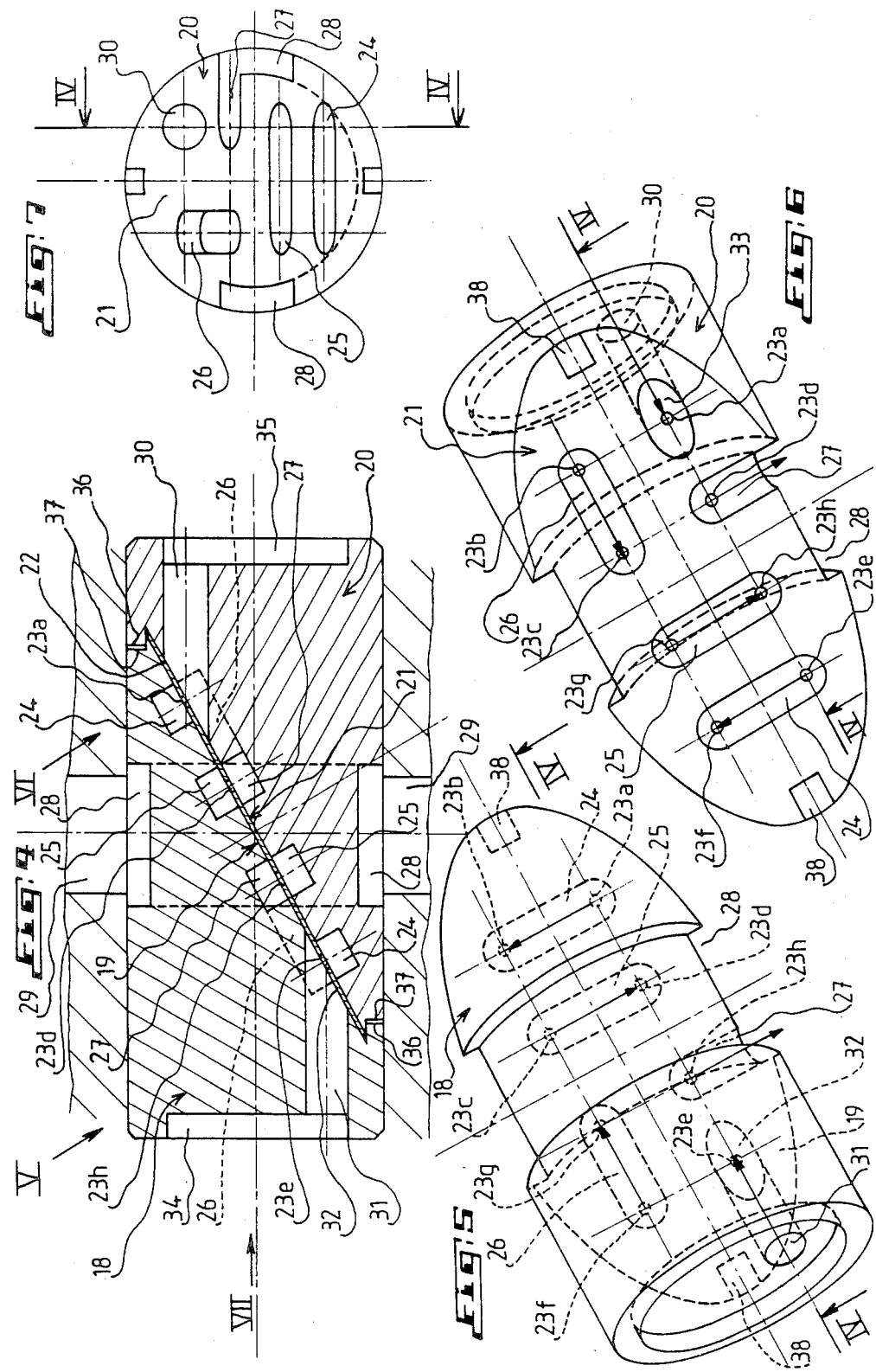

DAMPING DEVICE AND VEHICLE HEIGHT CORRECTOR USING SUCH A DEVICE

BACKGROUND OF THE INVENTION

The present invention has essentially for a subject matter a damping device adapted to be mounted for example on a height corrector of an automative vehicle equipped with a hydropneumatic suspension.

It is known that the vehicles equipped with a hydropneumatic suspension are provided on each axle with a height corrector allowing the trim of the vehicle to be restored according to load. Such a height corrector is composed generally of a hydraulic valve, preferably a slide valve, adapted to connect the suspension jacks either to a source of pressure or to a tank according to the vehicle load. Means responsive to the height of the axle are generally provided to control the slide of the valve.

To avoid untimely action of the height corrector during movement of the suspension, retarding means are generally provided to cause the height corrector to act only in case of a long-time variation of the vehicle trim. Such retarding means are generally so arranged that the displacement of the height corrector slide is accompanied by a flow of hydraulic fluid through a damping device.

More precisely, the height corrector includes two chambers with a movable or deformable wall co-operating with the corrector slide so that the displacement of the slide in one direction or the other is accompanied by variations in volumes of both chambers which are both connected to a hydraulic fluid tank through the medium of a circuit in which is mounted the said damping device, which of course allows free fluid communication in both directions between the tank and both chambers. Otherwise stated, one of the two chambers can suck the liquid while the other is discharging it, it being understood that the sucked and discharged volumes are not necessarily equal.

SUMMARY OF THE INVENTION

The invention has for a purpose to provide a new type of reliable and simplified damping device adapted to be mounted for example on the height corrector of a vehicle equipped with a hydropneumatic suspension.

This damping device is generally of the type arranged in a hydraulic circuit connecting two expansible chambers to a hydraulic fluid tank and is essentially characterized by a thin wall provided with a plurality of through holes and interposed between and in fluid-tight relationship to two elements with complementary slotted surfaces opposite the said wall.

According to a preferred form of embodiment, the two slotted surfaces pertain to two obliquely truncated, cylindrical elements, thus defining an oblique junction plane in which the said thin wall is located.

According to another feature of the invention, the elliptic surfaces of both cylindrical elements are each provided with an arrangement of slots opening in the junction plane, the said arrangement being identical on both elements as is deduced from the position of their respective slots when one element is rotated by 180° with respect to the other.

The damping device of the invention is further characterized by the fact that the fluid-tightness between the slotted surfaces and the thin wall interposed therebetween is ensured by grinding and tight mutual engagement.

According to still another feature, the slots of the two elements and the holes of the thin wall together define two hydraulic circuits connecting with a same annular groove located substantially at the middle of the said oblique junction plane and connected to the tank.

Furthermore, the said two cylindrical elements are each provided with a projection and a notch complementary to one another and co-operating with notches in the thin wall to ensure the centering of the whole assembly.

The invention is also directed to a height corrector for a vehicle equipped with a hydropneumatic suspension and of the type including a valve, preferably a slide valve, co-operating with the movable or deformable wall of two interconnected chambers, both of which are connected to a hydraulic fluid tank through a circuit in which is mounted at least one damping device complying with the aforementioned features.

BRIEF DESCRIPTION OF THE DRAWINGS

But other features and advantages of the invention will appear more clearly from the following detailed description with reference to the appended drawings given solely by way of example and wherein:

FIG. 1 is a sectional view of a height corrector of a known type;

FIG. 2 is a sectional view upon the line II—II of FIG. 1;

FIG. 3 is an enlarged view of the portion indicated by arrow III in FIG. 2;

FIG. 4 is a longitudinal sectional view of the damping device of the invention through the two inlet and outlet openings for the hydraulic fluid, upon the line IV—IV of FIGS. 5, 6 and 7;

FIG. 5 is a top view, in the direction of arrow V of FIG. 4, of the upper half of the damping device;

FIG. 6 is a top view, in the direction of arrow VI of FIG. 4, of the lower half of the damping device, the said lower half being separated from the upper half appearing in FIG. 5;

FIG. 7 is an end view, in the direction of arrow VII of FIG. 4, of the damping device with the upper half thereof removed.

DESCRIPTION OF THE PREFERRED EMBODIMENTS

Figure 8:
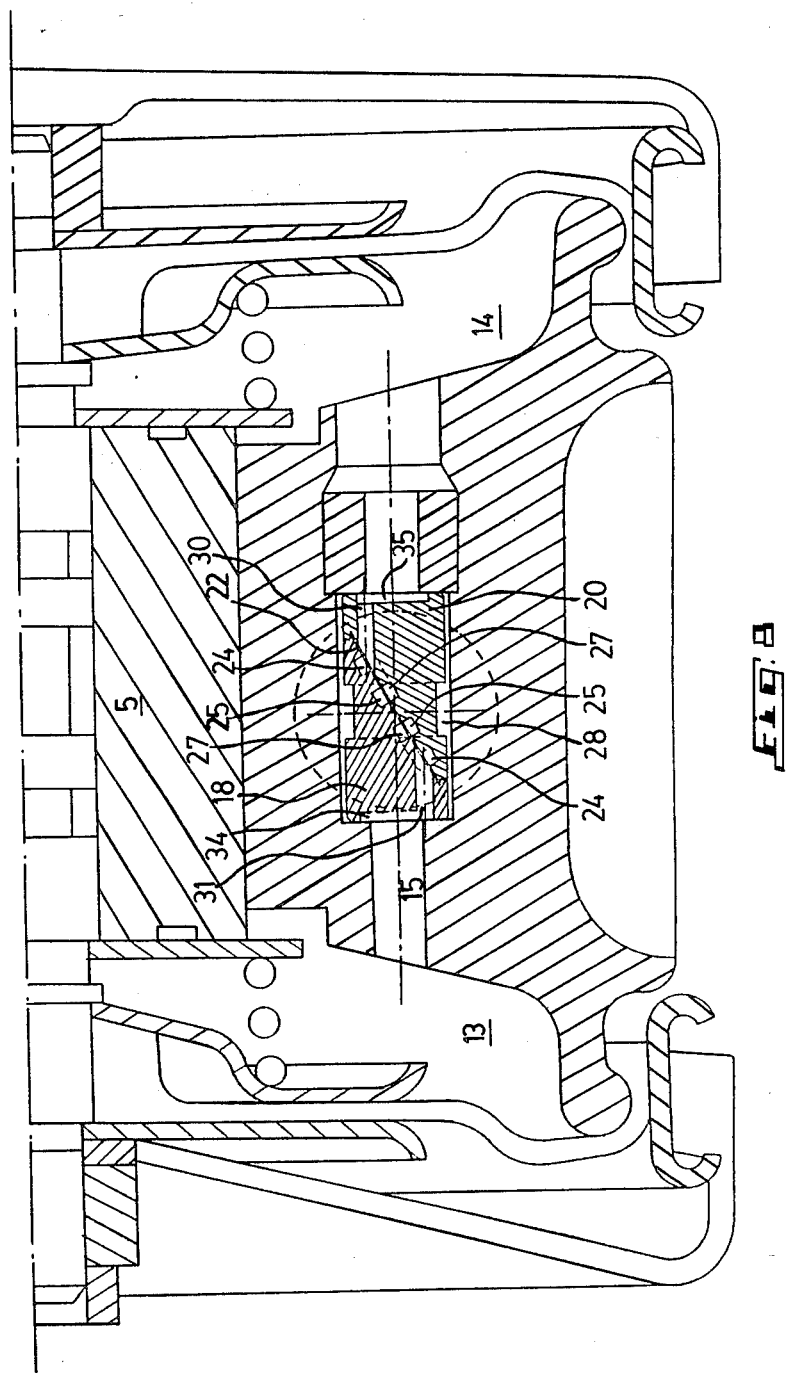
FIG. 8 is a sectional view similar to FIG. 2, of the assembled device of FIGS. 4–7 of the present invention.

A height corrector of a known type will first be described with reference to FIGS. 1 to 3.

This corrector includes a body 1 provided with a passageway 2 connected to suspension jacks (not shown). The body 1 is also provided with an inlet passageway 3 connected to a source of pressure and a return passageway 4 connected to a tank for a hydraulic fluid such as for example oil.

Into the body 1 is tightly fitted a sleeve 5 provided with passageways 6, 7 and 8 extending and communicating with the passageways 2, 3 and 4, respectively. Within the sleeve 5 is slidingly mounted a slide 9 provided with a groove 10 so that, depending on the position of the slide, the passageway 2 can be connected either to the source of pressure through the medium of the inlet passageway 3 or to the tank through the medium of the return passageway 4.

The slide 9 is coupled to two flexible or movable membranes 11 and 12 and can deform the two membranes which pertain to two chambers 13 and 14 filled with oil. As seen in FIG. 2, a bore 15 interconnects the chambers 13 and 14 and is connected to the tank through a passageway (not shown) connected to the centre 15a of the bore 15.

The bore is provided with a damping device which here is constituted by two assemblies of rings 16 and 17 which are clearly seen in FIG. 3 and arranged on either side of the centre 15a of the bore 15 connected to the oil tank. Thus, each of the chambers 13 and 14 is connected to the tank through the medium of a damper 16 or 17.

The present invention precisely is based on the particular embodiment of the damping device which will now be described in detail with reference to FIGS. 4 to 7.

According to the form of embodiment illustrated in these Figures, a damping device according to the invention includes a cylindrical body constituted by two identical cylindrical elements 18 and 20 which are truncated obliquely as shown at 19 and 21.

The two obliquely truncated portions 19 and 21 define two elliptic surfaces which are applied to one another with a thin wall 22 interposed therebetween and provided with calibrated orifices or holes 23a to 23h.

Both elliptic surfaces 19 and 21, as also the thin wall 22, are advantageously grinded so as to ensure fluid-tightness by mere tight engagement of both elements 18 and 20 with the said thin wall located in the oblique junction plane of the two elements.

Each truncated element 18, 20 is provided on its elliptic surface 19, 21 with four slots 24, 25, 26 and 27. The arrangement of the slots 24 to 27 opening in the junction plane of the two truncated elements 18 and 20 is identical as is deduced from the position of their respective slots when one element is rotated by 180° with respect to the other, as is understood by referring more particularly to FIGS. 5 and 6.

The slots 27 pertaining to the elements 18 and 20, respectively, open into an annular groove 28 provided in the cylindrical assembly constituted by the juxtaposed elements 18, 20 and 22. The groove 28 is connected to the oil tank through passageways 29.

Each element or half 18, 20 has a bore 30, 31 which is parallel with the axis of the element and opens on the elliptic sections or surfaces 19 or 21 depending on the elliptic hole designated by 32 and 33 particularly in FIGS. 5 and 6. To the centre of these holes correspond the orifices 23a and 23e provided in the thin wall 22.

When the damping device according to the invention is mounted on a height corrector such as the one illustrated in FIGS. 1 to 3, the bores 30 and 31 are connected to the bore 15 through the medium of the oil chambers 34 and 35.

Each of the truncated cylindrical elements 18 and 20 is provided with a projection 36 and a notch or cut 37, so that the pin 36 of the element 18 enters the notch 37 of the element 20. The projections 36 and the notches 37 cooperate with notches in the thin wall 22, these notches being designated by 38 in FIGS. 5 and 6. It is thus understood that the centering and fluid-tightness of the assembly constituted by the elements 18, 20 and 22 are ensured.

There will now be desscribed the operation of the damping device just described, i.e. the circulation of the hydraulic fluid in this device.

The oil proceeding from the bore 30 of the lower half 20 of the device to the elliptic opening 33 flows through a bore 23a of the thin wall 22. The oil thereafter flows into the slot 24 of the upper half 18, into a second hole 23b of the thin wall 22, into the slot 26 of the lower half 20, into a third hole 23c of the thin wall 22, into the slot 25 of the upper half 18, into a fourth hole 23d of the thin wall 22 and lastly into the slot 27 of the lower half 20, the said slot opening into the groove 28 connected to the tank (see solid arrows in FIGS. 5 and 6).

Likewise, the oil proceeding from the passageway 31 of the upper element 18 leads to the elliptic opening 32, flows through a hole 23e of the wall 22, and then flows successively through the slot 24 of the lower half or element 20, a hole 23f of the wall 22, the slot 26 of the upper element 18, another calibrated hole or bore 23g of the wall 22, the slot 25 of the lower element 20, another hole 23h of the wall 22, the slot 27 of the upper element 18 and, at this stage, the oil flows into the groove 28 connected to the tank (see broken arrows in FIGS. 5 and 6).

There is therefore obtained, according to the invention, a damping device composed merely of three elements in tight mutual engagement and defining two tortuous passages which, while interfering with the flow of oil, allow free oil communication in both directions between two chambers and a tank.

Of course, the invention is by no means limited to the form of embodiment described and illustrated which has been given by way of example only.

For example, the slots opening on the elliptic surface of each truncated cylindrical element 18, 20 may have any orientation without departing from the scope of the invention.

The invention therefore includes all technical equivalents to the means described as well as their combinations if the latter are carried out according to its gist.

What is claimed is:

1. A damping device for use in a hydraulic circuit adapted to connect a tank of hydraulic fluid to two chambers and allowing free circulation of this fluid in both directions between one or the other chamber to the tank, said device comprising in combination:
    two cylindrical elements (18, 20) which are obliquely truncated to thus define two elliptic surfaces (19, 21) which are adapted to mate with each other while defining an oblique junction plane;
    a thin wall (22) provided with a plurality of through holes (23a–23h) and located in said plane in fluid-tight relationship between said two elliptic surfaces; and
    each of said elliptic surfaces being provided with a plurality of slots (24, 25, 26, 27) which are identically arranged on both surfaces as is deduced from the position of the respective slots when one element is rotated by 180° with respect tothe other element, and which define together with said through holes of the thin wall, tortuous passages which interfere with the flow of the hydraulic fluid flowing in both directions between said tank and one or the other of said two chambers.

2. A damping device according to claim 1, whrein said two elements (18, 20) are provided with an annular groove (28) located substantially at the middle of said oblique junction plane and connected tothe tank, and said slots of the two elements with said through holes of th thin wall define together two hydraulic circuits connected to said groove and to said chambers, respectively.

3. A damping device according to claim 1, whrein said elliptic surfaces and thin wall are ground so as to ensure fluid-tightness by mere engagement of said surfaces with said wall.

4. A damping device according to claim 1, wherein said cylindrical elements are each provided with at least one projecting member (36) and one notch (37) cooperating with at last one notch and one projecting member of the other element respectively, and said thin wall comprises notches (38) engaging said projecting members and notches.

5. A height corrector for a vehicle having a hydropneumatic suspension, comprising a body, a slide-valve slidingly mounted in said body, two chambers containing a hydraulic fluid and provided with deformable walls attached to said slide-valve, three ducts (2, 3, 4) provided in said body and connected to suspension jacks, a source of pressure and a tank respectively so that that duct (2) connected to the suspension jacks may communicate either with the source of pressure or the tank depending on the position of said slide valve, conduit means for connecting both chambers to said tank and a damping device mounted in said conduit means and comprising:

two cylindrical elements which are obliquely truncated to thus define two elliptic surfaces which are adapted to mate with each other while defining an oblique junction plane;

a thin wall provided with a plurality of through holes and located in said plane in fluid-tight relationship between said two elliptic surfaces; and each of said elliptic surfaces being provided with a plurality of slots which are identically arranged on both surfaces as is defined from position of the respective slots when one element is rotated by 180° with respect to the other element, and which define together with said through holes of the thin wall, tortuous passages which interfere with the flow of the hydraulic fluid flowing in both directions between said tank and one or the other of said chambers.

* * * * *